May 30, 1950     W. J. ELVIN ET AL     2,509,290
PACKING
Filed March 6, 1946
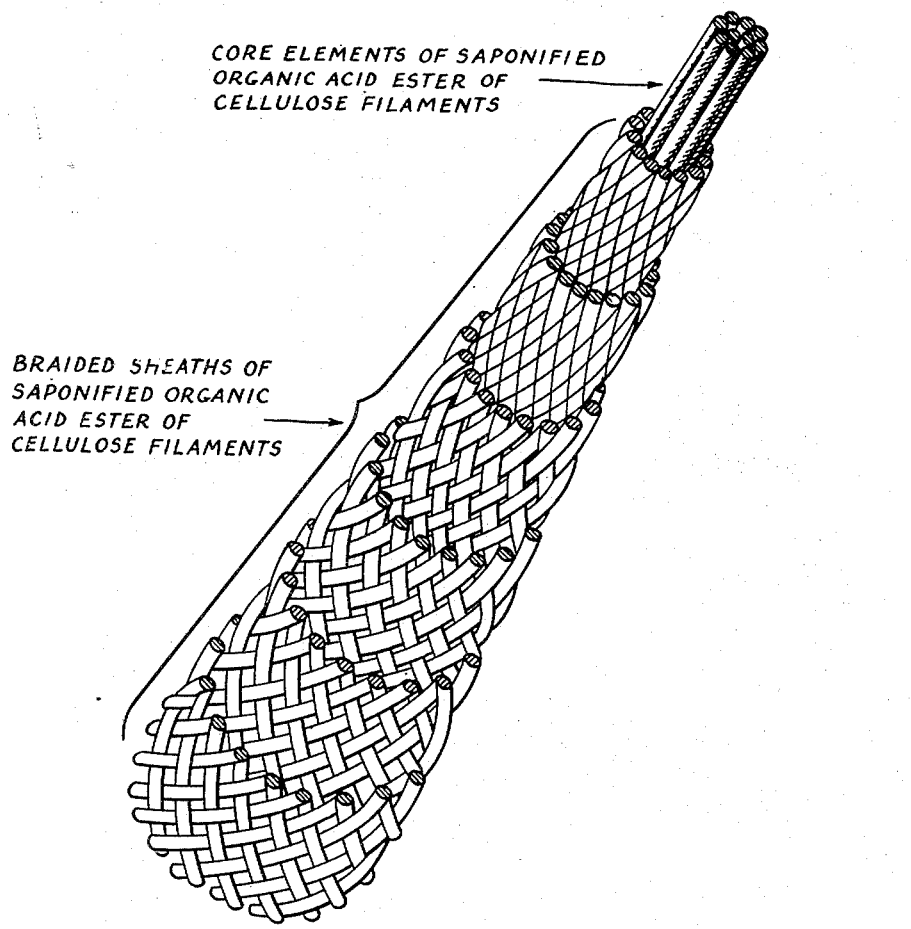
INVENTORS.
WILLIAM J. ELVIN
GEORGE L. McLUCKIE
BY
ATTORNEYS.

Patented May 30, 1950

2,509,290

UNITED STATES PATENT OFFICE 2,509,290

PACKING

William J. Elvin and George L. McLuckie, Frostburg, Md., assignors to Celanese Corporation of America, a corporation of Delaware Application March 6, 1946, Serial No. 652,481

2 Claims. (Cl. 288—17)

This invention relates to improved packing materials and relates more particularly to packing materials comprising continuous filament cellulosic materials having a basis of high tenacity regenerated cellulose yarns and filaments, as well as yarns and filaments having a basis of cellulose acetate or other organic derivative of cellulose.

While the novel packing materials of our invention may be employed in various types of mechanical equipment requiring packing material, the use of said packing materials will be more particularly described in connection with pumps.

Pumps and other types of mechanical equipment handling various liquid and vaporous materials and having a shaft rotating or reciprocating in bearings as an integral element thereof, and in contact with said materials, are usually provided with one or more stuffing boxes surrounding the shaft. By inserting a suitable form of packing in the stuffing boxes, usually, some form of fibrous material, leakage along the shaft into the bearings may be prevented. Usually after a period of service the packing hardens. The resulting loss in elasticity may permit some leakage unless the stuffing box glands are taken up to force the packing more tightly into the stuffing box and around the shaft. Additional packing may frequently be added. When all elasticity in the packing has finally been lost and taking up the stuffing box gland will no longer prevent leakage, the pump must be taken out of service, the old packing removed and the stuffing boxes completely repacked. Some types of packing become quite hard and not only must be replaced frequently but, in addition, cause excessive scoring and wear on the shaft.

It is, therefore, an important object of this invention to provide improved packing materials for use in stuffing boxes, which materials retain a substantial degree of elasticity even after an extended period of service.

Another object of this invention is the provision of improved continuous filament packing materials which cause substantially less abrasion and shaft wear than the packing materials heretofore employed.

A further object of this invention is the production of packing materials comprising continuous filament cellulosis materials having a basis of cellulose acetate or other organic derivative of cellulose, or of high tenacity regenerated cellulose materials.

Other objects of this invention will appear from the following detailed description and the accompanying drawing.

The figure in the drawing illustrates one embodiment of the novel packing material of this invention.

We have now found that materials formed by plying, cabling, and braiding a plurality of continuous filament cellulosic yarns into an unitary structure of high denier form stuffing box packing materials of outstanding characteristics and performance. Not only do said continuous filament packing materials exhibit longer useful life when placed in the stuffing boxes which are normally provided in mechanical devices such as pumps, but, furthermore, the use of said continuous filament packing materials produces far less wear on the shaft about which said packing is placed than those packing materials heretofore employed. Thus, the stuffing boxes require repacking much less frequently than when the usual materials are employed and this, of course, results in a considerable saving not only in labor cost but in the fact that the pumps are out of service only at relatively infrequent intervals. The substantially decreased shaft wear observed when employing our novel packing also constitutes a substantial improvement in packing performance since such wear may be considerable, and over a period of time, may measurably impair the strength of the shaft.

Where packing materials comprising continuous filaments having a basis of an organic derivative of cellulose are employed, the filaments may be prepared in the manner well-known to the art. The cellulose derivative, such as, for example, cellulose, acetate, is dissolved in a suitable volatile solvent therefore, and the resulting solution may be extruded through an orifice or plurality of orifices into an evaporative medium as in the dry method of spinning, or into a liquid coagulating medium as in the wet method of spinning. Suitable volatile solvents which may be employed are, for example, acetone, mixtures of acetone and ethyl or methyl alcohol, chloroform, ethylene dichloride, and mixtures of ethylene dichloride and ethyl or methyl alcohol. The continuous filament cellulose acetate yarns are then plied, cabled and braided and impregnated during the course of these operations with paraffin, tallow or other waxy material serving as a lubricant, to form a continuous packing material of the desired denier, a suitable number of ends being employed to produce a packing of the required diameter.

Most advantageously, however, the novel packing materials of our invention comprise lubricated high tenacity continuous cellulosic filaments having a basis of regenerated cellulose. Said high tenacity regenerated cellulose filaments may be formed by first stretching and then saponifying yarns having a basis of an organic acid ester of cellulose or said regenerated cellulose filaments may be formed by the viscose process wherein the yarns are subjected to a stretching operation while in the setting medium wherein the cellulose is regenerated.

In the case of regenerated cellulose yarns formed from yarns having a basis of an organic acid ester of cellulose, the yarns are stretched during some stage in their manufacture and the yarns may be increased in length as a result of the stretching operation to the extent of 200, 300, 500, or even 1000 or 2000% of their original length. The yarns acquire a relatively high tenacity on being stretched the tenacity being retained and in many instances enhanced by the saponification which effects a regeneration of the cellulose. The resulting high tenacity regenerated cellulose yarns are of great strength.

The saponification of the stretched yarns may be effected by means of any suitable basic agent. The saponifying agent may be inorganic in nature such as, for example, sodium hydroxide, potassium hydroxide, sodium silicate, ammonium hydroxide, sodium carbonate or other inorganic basic agents. Organic saponifying agents may also be employed such as, for example, methylamine, ethylene diamine, triethanolamine, or other organic bases. The saponifying agent may be employed in varying concentrations in aqueous, alcoholic, or aqueous/alcoholic solutions. Advantageously, the saponifying bath may be at a temperature of 20 to 100° C. during the saponification process. For example, when aqueous solutions of sodium hydroxide are employed as the saponifying agent, the sodium hydroxide may be present in a concentration of from 0.1 to 5% by weight and saponification may be effected in from 1 to 60 minutes with the solution at a temperature of from 30 to 90° C. When employing aqueous solutions of sodium hydroxide as the saponifying medium, it is preferable to include a salt such as sodium sulfate or sodium acetate in said solution.

To effect the desired saponification, the stretched yarns are led directly into the saponifying bath, the path through the saponifying bath being sufficiently extended and the speed at which the yarns pass through the bath being such that the yarn, under the conditions or both temperature and concentration employed, is completely saponified before leaving the bath. Speeds of 10 to 100 meters per minute are satisfactory.

The packing materials may be of any desired diameter containing any desired number of filaments. A total denier of from 100,000 to 3,000,000 or more is very satisfactory with the packing being of a diameter of from about 0.125 to 1 inch. To form the packing, for example, from 1 to 10 ends of 80 to 800 denier cellulose acetate or a high tenacity regenerated cellulose yarn containing ½ to 3 turns per inch may be chosen and then plied to form a plied yarn containing ½ to 3 turns per inch S twist. About 5 to 20 individual ends of the plied yarn are then preferably cabled inserting ½ to 3 turns per inch Z twist. The resulting single cabled yarn is impregnated with from 40 to 80% by weight of paraffin wax, tallow or other waxy material. From 4 to 16 ends of the cabled, impregnated yarn are gathered to form a core for the final packing material and from 8 to 24 ends of the cabled, impregnated yarn from which the core is formed are then braided about the core yarn as a sheath. The sheathed core yarn prepared in this way comprises the desired commercial packing material. Where a packing of greater diameter is desired, the sheathed core yarn may again be run through the braider any desired number of times as a core and a plurality of additional sheaths cabled on said core yarn. The sheathed core may be passed through the braider any number of times until a packing material of the desired diameter is obtained.

In order further to illustrate our invention but without being limited thereto, the following example is given:

*Example*

A packing material suitable for packing the stuffing box of a heavy duty pump is made in the following manner:

Three ends of a 270 denier, 360 filament high tenacity regenerated cellulose yarn containing 3 turns per inch of S twist and formed by stretching a cellulose acetate yarn 10 times and then saponifying it completely, are plied together while inserting 2.5 turns per inch of S twist. Eight ends of the plied yarn thus obtained are then cabled together while inserting 2.5 turns per inch of Z twist. The final cabled yarn, after being impregnated with about 60% by weight of tallow, is then forwarded to a braider. Ten ends of the impregnated cabled yarn are drawn through the center of the braider as a core and sixteen ends of said impregnated cabled yarn are mounted on the revolving carrier and braided around the ten-end core as a sheath. The braiding operation is repeated six times so as to obtain a final product ⅝ inch in diameter. The total denier of the resulting packing material is 1,350,000.

The packing material thus formed was installed in the stuffing boxes of a heavy duty centrifugal pump of 8,000 gallons per minute capacity having an impeller shaft 4.25 inches in diameter revolving at a speed of 1800 revolutions per minute. The pump operates with a 12 foot suction lift and a total head of 150 feet, the water passing through the pump ranging in temperature during the course of the test from 32 to 82° F. After 7,728.5 hours of service the packing was removed. On examination it was apparent that the packing was capable of many more hours of service since it retained a large measure of its resiliency and was still fairly soft at the point of contact with the rotating shaft. On measuring the shaft, the maximum wear was found to be only $\frac{1}{32}$ of an inch on the total diameter of 4.25 inches, which indicates exceptionally low friction and abrasive action. Employing a well known commercial packing under identical conditions, it was found that the diameter of the shaft was reduced $\frac{3}{32}$ of an inch after about the same number of hours of service.

The high tenacity regenerated cellulose yarn may be formed, as stated, by stretching and then saponifying a yarn having a basis of an organic acid ester of cellulose. Examples of said organic acid esters of cellulose which may be employed are, for example, cellulose acetate, cellulose propionate, cellulose butyrate, and mixed esters such as cellulose acetate-propionate and cellulose acetate-butyrate. Yarns having a basis of several organic acid esters of cellulose mentioned may also be employed in forming the packing materials.

It is to be understood that the foregoing detailed description is given merely by way of illustration and that many variations may be made therein without departing from the spirit of our invention.

Having described our invention, what we desire to secure by Letters Patent is:

1. As a new article of manufacture, a packing material comprising a plurality of associated, lubricated cabled yarn elements, each of said cabled yarn elements consisting of a plurality of plied yarns formed of several ends of multi-filament yarn of continuous, high tenacity filaments of regenerated cellulose formed by stretching and saponifying continuous filaments having a basis of an organic acid ester of cellulose, the association of the lubricated cabled yarn elements in the packing material consisting of a plurality of said lubricated cabled yarns as a core and a plurality of sheaths of said cabled yarns braided about said core.

2. Process for the production of packing materials comprising continuous, high tenacity filaments having a basis of regenerated cellulose, which comprises plying a plurality of ends of a multi-filament regenerated cellulose yarn formed by stretching and saponifying a yarn of continuous filaments of an organic acid ester of cellulose to form a plied yarn, cabling a plurality of said plied yarns to form a unitary cabled yarn structure, impregnating the cabled yarns with a lubricant, associating a plurality of said impregnated cabled yarns to form a core, and braiding a plurality of superimposed sheaths of said impregnated cabled yarns about said core.

WILLIAM J. ELVIN.
GEORGE L. McLUCKIE.

REFERENCES CITED

The following references are of record in the file of this patent:

UNITED STATES PATENTS

| Number | Name | Date |
|---|---|---|
| 91,995 | Yon | June 29, 1869 |
| 1,446,141 | Adams, Jr. | Feb. 20, 1923 |
| 1,690,846 | Turner | Nov. 6, 1928 |
| 1,703,269 | Garris | Feb. 26, 1929 |
| 1,979,343 | Peterson | Nov. 6, 1934 |
| 2,065,606 | Moore | Dec. 29, 1936 |
| 2,107,467 | Buhler | Feb. 8, 1938 |
| 2,282,466 | Etzkorn | May 12, 1942 |
| 2,334,399 | Fether | Nov. 16, 1943 |
| 2,334,400 | Fether | Nov. 16, 1943 |
| 2,337,986 | Fry | Dec. 28, 1943 |
| 2,360,106 | Buhler | Oct. 10, 1944 |
| 2,364,135 | Finlayson | Dec. 5, 1944 |

FOREIGN PATENTS

| Number | Country | Date |
|---|---|---|
| 645,203 | France | Oct. 22, 1928 |
| 1,234 | Great Britain | of 1867 |